United States Patent
Ueda et al.

(10) Patent No.: US 12,061,302 B2
(45) Date of Patent: Aug. 13, 2024

(54) SEISMIC SENSOR AND SENSOR CONTROL METHOD

(71) Applicant: OMRON Corporation, Kyoto (JP)

(72) Inventors: Naotsugu Ueda, Funabashi (JP); Masakazu Suzuki, Nissin (JP)

(73) Assignee: OMRON CORPORATION, Kyoto (JP)

( * ) Notice: Subject to any disclaimer, the term of this patent is extended or adjusted under 35 U.S.C. 154(b) by 646 days.

(21) Appl. No.: 17/268,609

(22) PCT Filed: Aug. 20, 2019

(86) PCT No.: PCT/JP2019/032417
§ 371 (c)(1),
(2) Date: Feb. 16, 2021

(87) PCT Pub. No.: WO2020/059384
PCT Pub. Date: Mar. 26, 2020

(65) Prior Publication Data
US 2021/0302604 A1    Sep. 30, 2021

(30) Foreign Application Priority Data

Sep. 21, 2018  (JP) .................................. 2018-177180

(51) Int. Cl.
*G01V 1/16*    (2006.01)
*G01V 1/01*    (2024.01)

(52) U.S. Cl.
CPC ............... *G01V 1/164* (2013.01); *G01V 1/01* (2024.01); *G01V 2210/1232* (2013.01); *G01V 2210/14* (2013.01)

(58) Field of Classification Search
CPC .......... G01V 1/008; G01V 2210/1232; G01V 2210/14; G01V 1/164
(Continued)

(56) References Cited

U.S. PATENT DOCUMENTS 10,613,240 B2 *  4/2020  Ueda ....................... G01V 1/162
11,422,272 B2 *  8/2022  Mino ....................... G01V 1/18
(Continued)

FOREIGN PATENT DOCUMENTS

CN    106687774 A    5/2017
JP    2001-59761 A   3/2001
(Continued)

OTHER PUBLICATIONS

Machine translation of WO-2018168101-A1, (Year: 2018).*
(Continued)

*Primary Examiner* — John E Breene
*Assistant Examiner* — Rose M Miller
(74) *Attorney, Agent, or Firm* — METROLEX IP LAW GROUP, PLLC; Robert L. Scott, Esq (57) ABSTRACT

A seismic sensor according to one or more embodiments may include: an acceleration measuring unit configured to repeatedly measure acceleration in three directions orthogonal to each other; and an index value calculator configured to operate in a measurement mode for calculating an index value of a magnitude of an earthquake based on a measurement result of acceleration in at least one direction by the acceleration measuring unit, and to operate in a standby mode with less power consumption than power consumption in the measurement mode. Then, the acceleration measuring unit monitors establishment of an activation condition that N times (M≥N≥2) measurement results in consecutive M times (M≥2) measurement results of acceleration in a predetermined direction exceed an acceleration threshold value. When the acceleration measuring unit detects establishment of the activation condition, the index value calculator transitions from the standby mode to the measurement mode.

15 Claims, 4 Drawing Sheets

(58) Field of Classification Search
USPC .......................................................... 73/649
See application file for complete search history.

(56) References Cited

U.S. PATENT DOCUMENTS

| | | | |
|---|---|---|---|
| 2017/0003406 A1 | 1/2017 | Ueda et al. | |
| 2017/0284840 A1 | 10/2017 | Mino et al. | |
| 2018/0239038 A1* | 8/2018 | Sakuma | G01V 1/18 |
| 2020/0012003 A1 | 1/2020 | Mino et al. | |

FOREIGN PATENT DOCUMENTS

| | | | | |
|---|---|---|---|---|
| JP | 2009-168509 A | 7/2009 | | |
| JP | 2015-111049 A | 6/2015 | | |
| JP | 2017-15603 A | 1/2017 | | |
| JP | 2017015604 A * | 1/2017 | | G01H 1/00 |
| TW | 201433810 A | 9/2014 | | |
| WO | 2013/145542 A1 | 10/2013 | | |
| WO | 2018168101 A1 | 9/2018 | | |

OTHER PUBLICATIONS

A Chinese Office Action issued on Sep. 5, 2022 in a counterpart Chinese patent application.
A an English translation of the International Search Report ("ISR") of PCT/JP2019/032417 mailed on Nov. 12, 2019.
A the Written Opinion("WO") of PCT/JP2019/032417 mailed on Nov. 12, 2019.

\* cited by examiner

SEISMIC SENSOR AND SENSOR CONTROL METHOD

TECHNICAL FIELD

The present invention relates to a seismic sensor and a sensor control method.

BACKGROUND ART

As a seismic sensor equipped with an acceleration sensor and a microcontroller (MCU), there is known a seismic sensor (see, for example, Japanese Unexamined Patent Publication No. 2017-15603, ("Patent Document 1")) in which the MCU transitions from a standby mode to a measurement mode with a higher power consumption when an acceleration measurement result by the acceleration sensor exceeds a threshold value, to measure a magnitude and the like of an earthquake that is occurring.

SUMMARY

In order to reduce a power consumption of the seismic sensor described above, it is desirable that a frequency (a probability) that the MCU transitions to the measurement mode in spite of no occurrence of an earthquake is low. However, by comparing an acceleration measurement result with a threshold value, no matter how the threshold value is adjusted, it is not possible to sufficiently reduce a frequency that the MCU transitions to the measurement mode in spite of no occurrence of an earthquake.

The present invention has been made in view of the above problem, and an object thereof is to provide a technique capable of reducing a frequency that an index value calculator such as an MCU transitions to a measurement mode in spite of no occurrence of an earthquake.

Means for Solving the Problem

In order to achieve the above object, a seismic sensor according to one aspect of the present invention includes: an acceleration measuring unit configured to repeatedly measure acceleration in three directions orthogonal to each other; and an index value calculator configured to operate in a measurement mode for calculating an index value of a magnitude of an earthquake based on a measurement result of acceleration in at least one direction by the acceleration measuring unit, and in a standby mode with less power consumption than power consumption in the measurement mode. Then, the acceleration measuring unit monitors establishment of an activation condition that N times (M≥N≥2) measurement results in consecutive M times (M≥2) measurement results of acceleration in a predetermined direction exceed an acceleration threshold value. Then, when the acceleration measuring unit detects establishment of the activation condition, the index value calculator transitions from the standby mode to the measurement mode.

That is, in the seismic sensor according to one aspect of the present invention, when the acceleration measuring unit detects establishment of the activation condition that N times (M≥N≥2) measurement results in consecutive M times (M≥2) measurement results of acceleration in a predetermined direction exceed the acceleration threshold value, the index value calculator transitions to the measurement mode. This activation condition of the seismic sensor is less likely to be established due to noise, than an activation condition that a measurement result of acceleration in a predetermined direction exceeds an acceleration threshold value (the activation condition of the seismic sensor described in Patent Document 1). Therefore, by adopting the above configuration, it is possible to realize a seismic sensor with a lower frequency, than before, that the index value calculator such as the MCU transitions to the measurement mode in spite of no occurrence of an earthquake.

The activation condition of the seismic sensor may be a condition that consecutive N times measurement results of acceleration in a predetermined direction exceed an acceleration threshold value (that is, M=N). However, if M=N is set, the index value calculator does not start an operation in the measurement mode due to the fact that a part of the N times acceleration measurement results simply becomes less than the acceleration threshold value due to noise or the like. Therefore, if M=N is set, the transition to the measurement mode (in other words, a start of original processing of the seismic sensor) may be delayed. Whereas, by setting M>N, even if a part of the M times acceleration measurement results becomes less than the acceleration threshold value due to noise, the index value calculator starts the operation in the measurement mode. Therefore, by setting M>N, it is possible to prevent a delay due to noise, in the transition to the measurement mode.

The index value calculator of the seismic sensor may be given with a function of determining whether or not an earthquake has occurred during an operation in the measurement mode based on a measurement result of acceleration in at least one direction by the acceleration measuring unit, and increasing the N value or the acceleration threshold value at the time of transition from the measurement mode to the standby mode when it is determined that no earthquake has occurred. In addition, the index value calculator may be given with a function of determining whether or not an earthquake has occurred during an operation in the measurement mode based on a measurement result of acceleration in at least one direction by the acceleration measuring unit, and increasing the acceleration threshold value at the time of transition from the measurement mode to the standby mode when it is determined that an earthquake has not occurred.

By giving the above functions to the index value calculator, it is possible to realize a seismic sensor that can automatically change the activation condition to a more appropriate condition (a condition with a less frequency that the index value calculator transitions to the measurement mode in spite of no occurrence of an earthquake).

When the acceleration measuring unit is configured such that the acceleration threshold value and the N value can be set, the seismic sensor may be provided with a setting unit configured to determine the acceleration threshold value and the N value that do not satisfy the activation condition when acceleration in the predetermined direction changes in a temporal change pattern, and to set the acceleration threshold value and the N value in the acceleration measuring unit, based on the temporal change pattern of acceleration in the predetermined direction measured by the acceleration measuring unit in a situation where no earthquake has occurred. From combinations of the acceleration threshold value and the N value specified in advance, the setting unit may determine the acceleration threshold value and the N value that do not satisfy the activation condition when acceleration in the predetermined direction changes in the temporal change pattern, and set the acceleration threshold value and the N value in the acceleration measuring unit.

Further, a sensor control method according to one aspect of the present invention is a sensor control method of controlling a seismic sensor including a three-axis acceleration sensor and a microcontroller. In the sensor control method, the seismic sensor is operated in a standby mode in which monitoring is performed on establishment of an activation condition that N times (M≥N≥2) measurement results in consecutive M times (M≥2) measurement results of acceleration in a predetermined direction by the three-axis acceleration sensor exceed an acceleration threshold value, and the microcontroller is made to start an operation in the measurement mode with larger power consumption than power consumption in the standby mode when the activation condition is established.

According to this sensor control method, it is possible to reduce a frequency that the microcontroller in the seismic sensor transitions to the measurement mode in spite of no occurrence of an earthquake.

Effect of the Invention

According to the present invention, it is possible to reduce a frequency that the index value calculator or the MCU transitions to the measurement mode in spite of no occurrence of an earthquake.

MODE FOR CARRYING OUT THE INVENTION

Hereinafter, embodiments of the present invention will be described with reference to the drawings.

First Embodiment

Figure 1:
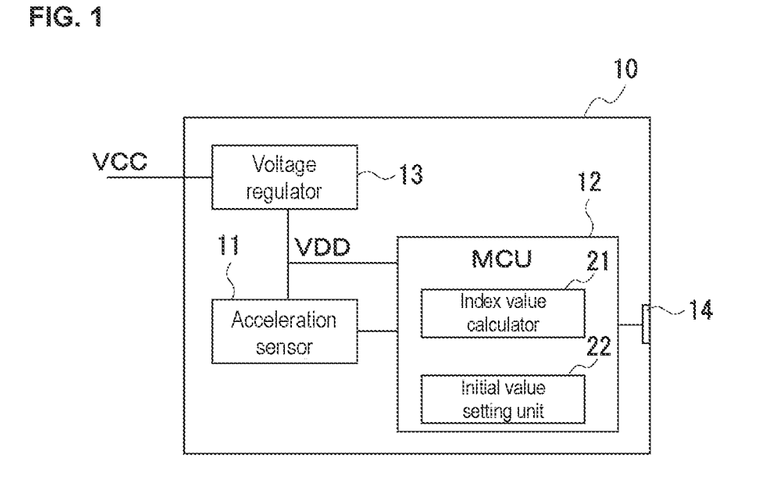
FIG. 1 is an explanatory diagram illustrating a schematic configuration of a seismic sensor according to a first embodiment.

FIG. 1 shows a schematic configuration of a seismic sensor 10 according to a first embodiment.

The seismic sensor 10 according to the embodiment is a device (a sensor) configured to, for example, calculate an index value of a magnitude of an earthquake. As illustrated, the seismic sensor 10 includes an acceleration sensor 11, a microcontroller (MCU) 12, a voltage regulator 13, and a terminal unit 14 including a plurality of terminals.

The voltage regulator 13 is a regulator configured to convert a voltage VCC from a power source (a dry cell or the like) into a predetermined voltage VDD, to supply to the acceleration sensor 11 and the MCU 12.

The acceleration sensor 11 is a three-axis acceleration sensor of a digital output type. The acceleration sensor 11 has a function of monitoring satisfaction of an activation condition (details will be described later) and outputting an interrupt signal when the satisfaction of the activation condition is detected. Moreover, the acceleration sensor 11 is set with an offset in each direction (an axial direction) and a sampling frequency, by the MCU 12. Then, the acceleration sensor 11 measures acceleration in each direction at the set sampling frequency, and outputs the acceleration subjected to offset correction as a measurement result of the acceleration in each direction.

The MCU 12 is a unit configured to perform processing and the like for calculating an index value of a magnitude of an earthquake that is occurring (a spectral intensity (SI) value and PGA (maximum acceleration) in the embodiment), based on a measurement result of acceleration by the acceleration sensor 11.

Specifically, the MCU 12 functions as an index value calculator 21, an initial value setting unit 22, and the like, in accordance with an instruction inputted from another device (another MCU or the like) via the terminal unit 14.

First, an operation of the index value calculator 21 will be described.

The index value calculator 21 (that is, the MCU 12 functioning as the index value calculator 21) is operating in a standby mode with a low power consumption (in the embodiment, a sleep mode in which a CPU does not operate) until the acceleration sensor 11 notifies that the activation condition is established, through the interrupt signal.

Figure 2:
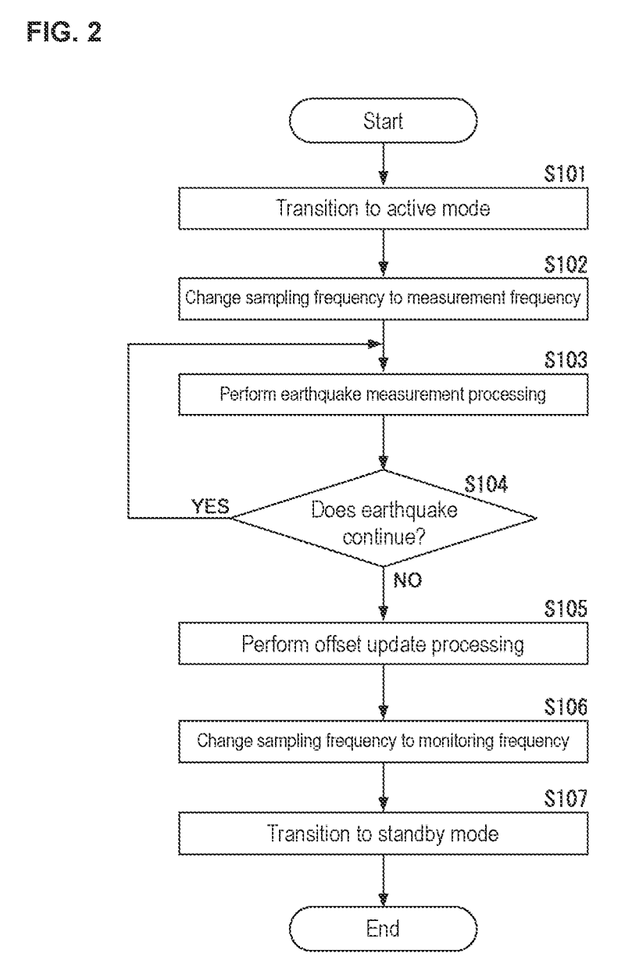
FIG. 2 is a flowchart illustrating measurement mode processing.

When the acceleration sensor 11 notifies that the activation condition is established, the index value calculator 21 transitions to a measurement mode by starting measurement mode processing of a procedure shown in FIG. 2. Note that, when a predetermined instruction is given from another device via the terminal unit 14, the index value calculator 21 is brought into a state of transitioning to the measurement mode by starting second measurement mode processing. However, for convenience of description, details of the second measurement mode processing will be described later.

As shown in FIG. 2, the index value calculator 21 having transitioned to the measurement mode transitions to an active mode first, in which the CPU in the MCU 12 operates (step S101). Next, the index value calculator 21 changes a sampling frequency of the acceleration sensor 11 to a measurement frequency higher than a monitoring frequency (step S102). Note that the monitoring frequency is a sampling frequency (see step S106) of the acceleration sensor 11 when establishment of the activation condition is monitored.

After that, based on the measurement result of acceleration in each direction by the acceleration sensor 11, the index value calculator 21 performs earthquake measurement processing (step S103) of repeatedly calculating an index value (an SI value and PGA in the embodiment) of a magnitude of an earthquake that is occurring, for a predetermined number of times. Note that, during this earthquake measurement processing, the index value calculator 21 repeats a process of collecting acceleration measurement results in the sleep mode and calculating the index value of the magnitude of the earthquake in the active mode. In addition, during the earthquake measurement processing, the index value calculator 21 also determines whether or not a seismic waveform satisfies a condition for outputting a shut-off signal (a condition of a waveform specified in JWDS 0007 Appendix 2 of Japan Electrical Wiring Devices and Equipment Industries Association). Then, when the seismic waveform satisfies the condition for outputting a shut-off signal, the index value calculator 21 outputs the shut-off signal from a shut-off signal output terminal in the terminal unit 14.

When the earthquake measurement processing is completed, the index value calculator 21 determines whether or not the earthquake continues, based on a measurement result of acceleration in each direction by the acceleration sensor 11 (step S104). Then, when the earthquake continues (step S104; YES), the index value calculator 21 returns to step S103 and executes the earthquake measurement processing again.

Whereas, when the earthquake has not continued (step S104; NO), the index value calculator 21 performs offset update processing (step S105), which is a process of resetting an offset in the acceleration sensor 11. Next, the index value calculator 21 changes a sampling frequency of the acceleration sensor 11 to the monitoring frequency (step S106). Then, the index value calculator 21 transitions to the standby mode (the sleep mode), and then ends the measurement mode processing.

As is apparent from the description so far, the seismic sensor 10 according to the embodiment is configured such that the index value calculator 21 (the MCU 12) does not operate in the measurement mode when no earthquake has occurred, to achieve lower power consumption.

However, by simply comparing the acceleration measurement result with the threshold value as in the past, it is difficult to sufficiently reduce the frequency that the index value calculator 21 (the MCU 12) transitions to the measurement mode in spite of no occurrence of an earthquake. Therefore, the seismic sensor 10 according to the embodiment adopts, as an activation condition, a condition that consecutive N times measurement results of acceleration in a predetermined direction exceed the acceleration threshold value. This activation condition is less likely to be established due to noise, than a conventional activation condition that a measurement result of acceleration in a predetermined direction exceeds a threshold value. Therefore, by setting appropriate values for the N value and the acceleration threshold value, the seismic sensor 10 is to function as a sensor with a lower frequency, than before, that the index value calculator 21 transitions to the measurement mode in spite of no occurrence of an earthquake.

The initial value setting unit 22 (FIG. 1) is prepared for setting an appropriate N value and acceleration threshold value in the acceleration sensor 11.

Specifically, the MCU 12 starts an operation as the initial value setting unit 22 when a predetermined instruction is inputted from another device (another MCU or the like) via the terminal unit 14.

Then, the initial value setting unit 22 (the MCU 12 having started an operation as the initial value setting unit 22) performs the offset update processing and then performs initial value setting processing.

Figure 3:
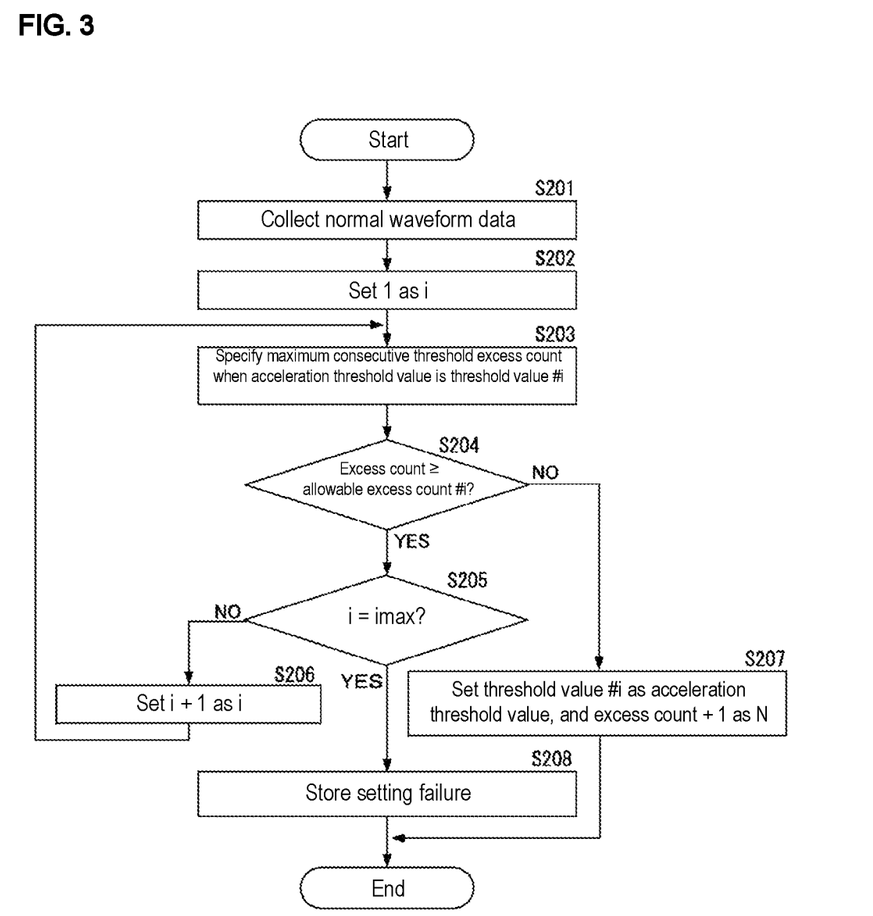
FIG. 3 is a flowchart illustrating initial value setting processing.

The initial value setting processing performed by the initial value setting unit 22 is a process of a procedure shown in FIG. 3. Note that, in this figure and the following description, a threshold value #i (i=1 to imax) is a value preset in the initial value setting unit 22 as a value that can be used as the acceleration threshold value. The threshold value #i is set so as to increase as a threshold number (i value) increases. An allowable excess count #i (i=1 to imax) is a value preset in the initial value setting unit 22 as an upper limit value of the N value when the threshold value #i is used as the acceleration threshold value. As each allowable excess count #i (i=1 to imax), for example, there is used such a value that, for example, when the value is exceeded, transition to the measurement mode is delayed and realization of a minimum required accuracy is inhibited.

As illustrated, the initial value setting unit 22 having started the initial value setting processing firstly collects a measurement result (hereinafter, normal waveform data) of acceleration for a predetermined time from the acceleration sensor 11 (step S201). Next, the initial value setting unit 22 sets a variable i to "1" (step S202). After that, the initial value setting unit 22 specifies a maximum consecutive threshold excess count when an acceleration threshold value is the threshold value #i, based on the normal waveform data (step S203). Specifically, the initial value setting unit 22 counts each number of times acceleration exceeding the threshold value #i is continuously measured, by analyzing the normal waveform data. Then, the initial value setting unit 22 specifies a maximum value of a count result as the maximum consecutive threshold excess count when the acceleration threshold value is the threshold value #i.

The initial value setting unit 22 having completed the process of step S203 determines whether or not the specified maximum consecutive threshold excess count (hereinafter, also referred to as an excess count) is equal to or larger than the allowable excess count #i (step S204). When the excess count is not equal to or larger than the allowable excess count #i (step S204; NO), the initial value setting unit 22 sets the threshold value #i and the "excess count+1" respectively as the acceleration threshold value and the N value in the acceleration sensor 11 (step S207). Then, the initial value setting unit 22 ends this initial value setting processing.

Whereas, when the excess count is equal to or larger than the allowable excess count #i (step S204; YES), the initial value setting unit 22 determines whether or not i=imax is established (step S205). When i=imax is not established (step S205; NO), the initial value setting unit 22 increments the i value by "1" (step S206), and then starts the processes of step S203 and subsequent steps again. In addition, when i=imax is established (step S205; YES), that is, when the N value equal to or less than the allowable excess count cannot be found even when the acceleration threshold value is set to any of the threshold values #1 to #imax, the initial value setting unit 22 stores a setting failure in a predetermined register accessible to another device (step S208), and then ends the initial value setting processing.

Figure 4:
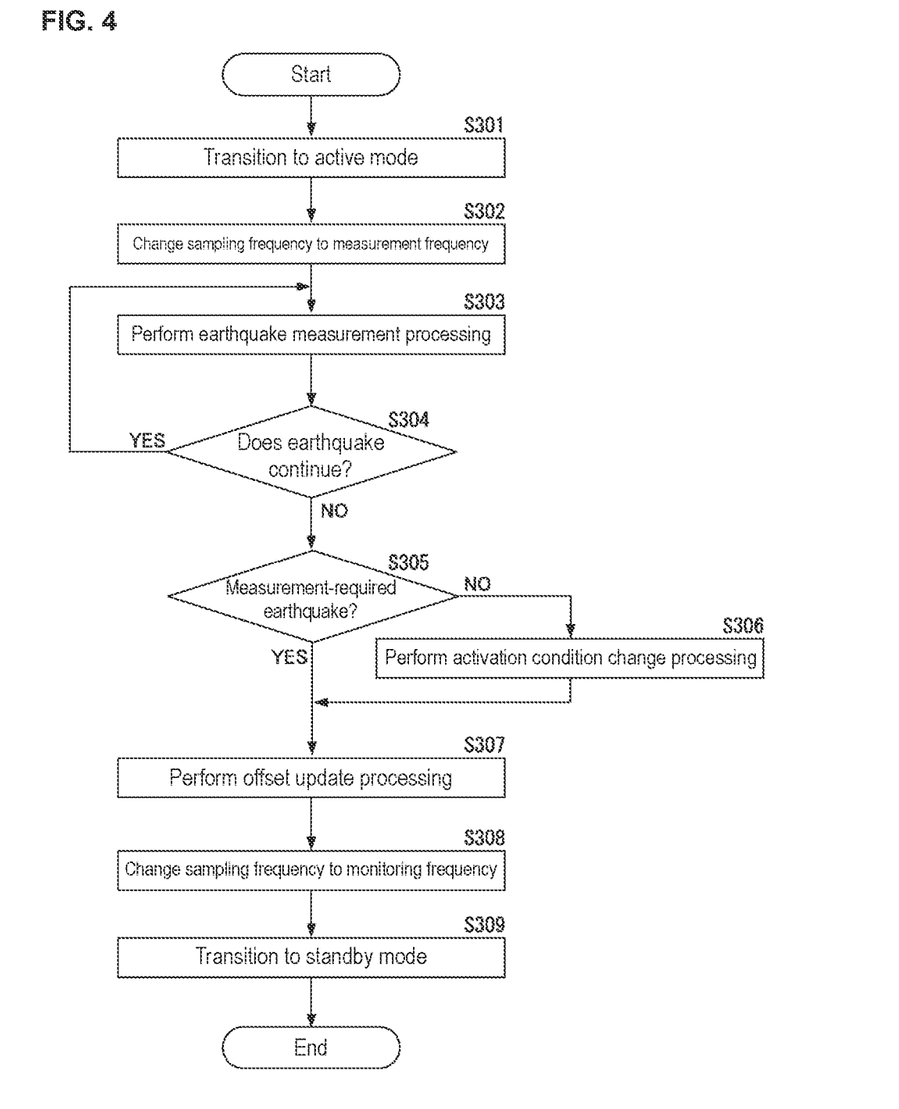
FIG. 4 is a flowchart illustrating second measurement mode processing.

Hereinafter, the second measurement mode processing that can be executed by the index value calculator 21 will be described.

FIG. 4 shows a flowchart of the second measurement mode processing. This the second measurement mode processing is a process in which the measurement mode processing (FIG. 2) is added with processes (steps S305 and S306) for updating, to values more suitable for a current situation, the acceleration threshold value and the N value set in the acceleration sensor 11 through the initial value setting processing (FIG. 3).

Specifically, the processes of S301 to S304 and S307 to S309 of the second measurement mode processing are the same as the processes of steps S101 to S104 and S105 to S107 of the measurement mode processing, respectively.

However, in the second measurement mode processing, as illustrated, when the earthquake does not continue (step S304; NO), it is determined whether or not a cause of starting the second measurement mode processing has been an earthquake for which earthquake measurement processing should be performed (in the figure, a measurement-required earthquake) (step S305).

Then, when the cause of starting the second measurement mode processing is not the earthquake for which the earthquake measurement processing should be performed (step S305; NO), activation condition change processing (step S306) for changing the activation condition to one that is less likely to be established is performed. As the activation condition change processing, for example, the following processing can be adopted.

Processing to unconditionally increase the N value by a predetermined amount (for example, "1")

Processing to increase the N value by a predetermined amount when the N value does not exceed the allowable excess count even after being increased by a predetermined amount, and raise the acceleration threshold value by one step and set the N value to a minimum value (for example, "2") when the N value exceeds the allowable excess count after being increased by the predetermined amount Processing to increase the acceleration threshold value by a predetermined amount Processing similar to the initial value setting processing Processing to lower the monitoring frequency As described above, the seismic sensor 10 according to the embodiment is configured such that the MCU 12 (the index value calculator 21) transitions to the measurement mode when consecutive N times measurement results of acceleration in a predetermined direction exceed the acceleration threshold value. Further, the seismic sensor 10 also has a function of setting an appropriate N value and acceleration threshold value in the acceleration sensor 11 (FIGS. 3 and 4). Therefore, the seismic sensor 10 functions as a sensor that hardly transitions to the measurement mode in spite of no occurrence of an earthquake.

Second Embodiment

Hereinafter, using the same reference numerals as those used in the description of the seismic sensor 10 of the first embodiment, a configuration and an operation of a seismic sensor 10 according to a second embodiment will be described focusing on parts different from the seismic sensor 10 of the first embodiment.

The seismic sensor 10 according to the second embodiment adopts, as an acceleration sensor 11, one having a function of monitoring establishment of an activation condition that N times (M>N≥2) measurement results in consecutive M times (M>2) measurement results of acceleration in a predetermined direction exceed an acceleration threshold value, and outputting an interrupt signal when satisfaction of the activation condition is detected. Then, in the seismic sensor 10 according to the second embodiment, programming of an MCU 12 has been changed such that N+F(N) (F(N) is an integer value preset as a function of N) is also set in the acceleration sensor 11 as the M value when the N value is set to the acceleration sensor 11.

In addition, a combination of the following circuits is to be a logic circuit (hereinafter, referred to as an activation condition establishment monitoring circuit) mounted on the acceleration sensor 11 according to the embodiment in order to monitor establishment of the above activation condition.

A first counter configured to start counting the number of samplings (the number of acceleration measurements) when an acceleration measurement result in a set direction (a direction set by the MCU 12) exceeds an acceleration threshold value A second counter configured to start counting the number of times a measurement result of acceleration in a set direction becomes equal to or less than the acceleration threshold value when the acceleration in the set direction exceeds the acceleration threshold value A determination circuit configured to reset both the first and second counters when "second counter value>M−N" is established, and determine that an activation condition is established when "first counter value−second counter value≥N" is established That is, the activation condition establishment monitoring circuit is a circuit that determines that the activation condition is established when it is confirmed that N times (M>N≥2) measurement results in consecutive M times (M>2) measurement results of acceleration in a predetermined direction exceed the acceleration threshold value, even if the M times acceleration measurements are not completed.

In the seismic sensor 10 according to the first embodiment, the index value calculator 21 does not start an operation in the measurement mode due to the fact that a part of the N times acceleration measurement results simply becomes less than the acceleration threshold value due to noise or the like. Therefore, in the seismic sensor 10 according to the first embodiment, the transition to the measurement mode (in other words, a start of original processing of the seismic sensor 10) may be delayed. However, in the seismic sensor 10 according to the second embodiment, even if a part of the M times acceleration measurement results becomes less than the acceleration threshold value due to noise, the index value calculator 21 starts the operation in the measurement mode. Therefore, by adopting the configuration of the seismic sensor 10 according to the second embodiment, it is possible to prevent delay of transition to the measurement mode due to noise.

Modified Embodiment

The seismic sensor 10 according to each of the above-described embodiments can be modified in various ways. For example, the seismic sensor 10 may be modified into one provided with a display configured to display an index value of a magnitude of an earthquake. Further, the initial value setting processing may be modified to processing of: obtaining a maximum amplitude from normal waveform data; setting a % (for example, 40%) of the obtained maximum amplitude as an acceleration threshold value; and obtaining an N value from a maximum consecutive threshold excess count when the acceleration threshold value is used. Further, the acceleration sensor 11 may compare acceleration before offset correction with a threshold value (acceleration threshold value+offset) when monitoring satisfaction of the activation condition. Further, instead of the acceleration sensor 11, the seismic sensor 10 may be modified into a sensor equipped with an analog acceleration sensor and a circuit (IC) configured to perform digitization and the like on an output of the analog acceleration sensor.

The acceleration sensor 11 for the seismic sensor 10 according to the second embodiment may be mounted with a circuit having a configuration different from that described above, as an activation condition establishment monitoring circuit to monitor establishment of an activation condition (N times (M>N≥2) measurement results in consecutive M times (M>2) measurement results of acceleration in a predetermined direction exceed an acceleration threshold value).

Supplementary Note

A seismic sensor (10) including:
an acceleration measuring unit (11) configured to repeatedly measure acceleration in three directions orthogonal to each other; and
an index value calculator (21) configured to operate in a measurement mode for calculating an index value of a magnitude of an earthquake based on a measurement result of acceleration in at least one direction by the acceleration measuring unit, and in a standby mode with less power consumption than power consumption in the measurement mode, in which
the acceleration measuring unit (11) monitors establishment of an activation condition that N times (M≥N≥2)

measurement results in consecutive M times (M≥2) measurement results of acceleration in a predetermined direction exceed an acceleration threshold value, and when the acceleration measuring unit (11) detects establishment of the activation condition, the index value calculator (21) transitions from the standby mode to the measurement mode.

A sensor control method of controlling a seismic sensor (10) including a three-axis acceleration sensor (11) and a microcontroller (12), the sensor control method including:

operating the seismic sensor (10) in a standby mode in which monitoring is performed on establishment of an activation condition that N times (M≥N≥2) measurement results in consecutive M times (M≥2) measurement results of acceleration in a predetermined direction by the three-axis acceleration sensor (11) exceed an acceleration threshold value; and causing the microcontroller (12) to start an operation in a measurement mode with larger power consumption than power consumption in the standby mode when the activation condition is established.

DESCRIPTION OF SYMBOLS 10 seismic sensor
11 acceleration sensor
12 microcontroller
13 voltage regulator
14 terminal unit
21 index value calculator
22 initial value setting unit

The invention claimed is:

1. A seismic sensor comprising:
an acceleration measuring unit configured to repeatedly measure acceleration in three directions orthogonal to each other; and
an index value calculator configured to operate in a measurement mode for calculating an index value of a magnitude of an earthquake based on a measurement result of acceleration in at least one direction by the acceleration measuring unit, and in a standby mode with less power consumption than power consumption in the measurement mode,
wherein the acceleration measuring unit monitors establishment of an activation condition in which N measurement results, N being a value equal to or smaller than M and equal to or larger than 2, in M consecutive measurement results, M being a value equal to or larger than 2, comprising acceleration in a predetermined direction exceed an acceleration threshold value, and
in response to the acceleration measuring unit detecting the establishment of the activation condition, the index value calculator transitions from the standby mode to the measurement mode.

2. The seismic sensor according to claim 1, wherein M is larger than N.

3. The seismic sensor according to claim 2, wherein
the acceleration measuring unit is configured to enable setting of the N value, and
the index value calculator determines whether or not an earthquake has occurred during an operation in the measurement mode based on a measurement result of acceleration in at least one direction by the acceleration measuring unit, and the index value calculator increases the N value at a time of transition from the measurement mode to the standby mode when it is determined that an earthquake has not occurred.

4. The seismic sensor according to claim 2, wherein
the acceleration measuring unit is configured to enable setting of the acceleration threshold value, and
the index value calculator determines whether or not an earthquake has occurred during an operation in the measurement mode based on a measurement result of acceleration in at least one direction by the acceleration measuring unit, and the index value calculator increases the acceleration threshold value at a time of transition from the measurement mode to the standby mode when it is determined that an earthquake has not occurred.

5. The seismic sensor according to claim 2, wherein
the acceleration measuring unit is configured to enable setting of a measurement cycle of acceleration in the three directions, and
the index value calculator determines whether or not an earthquake has occurred during an operation in the measurement mode based on a measurement result of acceleration in at least one direction by the acceleration measuring unit, and the index value calculator reduces a measurement cycle of acceleration in the three directions by the acceleration measuring unit during monitoring of establishment of the activation condition, at a time of transition from the measurement mode to the standby mode when it is determined that an earthquake has not occurred.

6. The seismic sensor according to claim 2, wherein
the acceleration measuring unit is configured to enable setting of the acceleration threshold value and the N value, and
there is further comprised a setting unit configured to determine the acceleration threshold value and the N value that do not satisfy the activation condition when acceleration in the predetermined direction changes in a temporal change pattern, and to set the acceleration threshold value and the N value in the acceleration measuring unit, based on the temporal change pattern of acceleration in the predetermined direction measured by the acceleration measuring unit in a situation where no earthquake has occurred.

7. The seismic sensor according to claim 1, wherein
the acceleration measuring unit is configured to enable setting of the N value, and
the index value calculator determines whether or not an earthquake has occurred during an operation in the measurement mode based on a measurement result of acceleration in at least one direction by the acceleration measuring unit, and the index value calculator increases the N value at a time of transition from the measurement mode to the standby mode in response to it being determined that an earthquake has not occurred.

8. The seismic sensor according to claim 3, wherein
the acceleration measuring unit is configured to enable setting of the acceleration threshold value and the N value, and
there is further comprised a setting unit configured to determine the acceleration threshold value and the N value that do not satisfy the activation condition when acceleration in the predetermined direction changes in a temporal change pattern, and to set the acceleration threshold value and the N value in the acceleration measuring unit, based on the temporal change pattern of acceleration in the predetermined direction measured by the acceleration measuring unit in a situation where no earthquake has occurred.

9. The seismic sensor according to claim 1, wherein
the acceleration measuring unit is configured to enable setting of the acceleration threshold value, and
the index value calculator determines whether or not an earthquake has occurred during an operation in the measurement mode based on a measurement result of acceleration in at least one direction by the acceleration measuring unit, and the index value calculator increases the acceleration threshold value at a time of transition from the measurement mode to the standby mode when it is determined that an earthquake has not occurred.

10. The seismic sensor according to claim 9, wherein
the acceleration measuring unit is configured to enable setting of the acceleration threshold value and the N value, and
there is further comprised a setting unit configured to determine the acceleration threshold value and the N value that do not satisfy the activation condition when acceleration in the predetermined direction changes in a temporal change pattern, and to set the acceleration threshold value and the N value in the acceleration measuring unit, based on the temporal change pattern of acceleration in the predetermined direction measured by the acceleration measuring unit in a situation where no earthquake has occurred.

11. The seismic sensor according to claim 1, wherein
the acceleration measuring unit is configured to enable setting of a measurement cycle of acceleration in the three directions, and
the index value calculator determines whether or not an earthquake has occurred during an operation in the measurement mode based on a measurement result of acceleration in at least one direction by the acceleration measuring unit, and the index value calculator reduces a measurement cycle of acceleration in the three directions by the acceleration measuring unit during monitoring of establishment of the activation condition, at a time of transition from the measurement mode to the standby mode when it is determined that an earthquake has not occurred.

12. The seismic sensor according to claim 11, wherein
the acceleration measuring unit is configured to enable setting of the acceleration threshold value and the N value, and
there is further comprised a setting unit configured to determine the acceleration threshold value and the N value that do not satisfy the activation condition when acceleration in the predetermined direction changes in a temporal change pattern, and to set the acceleration threshold value and the N value in the acceleration measuring unit, based on the temporal change pattern of acceleration in the predetermined direction measured by the acceleration measuring unit in a situation where no earthquake has occurred.

13. The seismic sensor according to claim 1, wherein
the acceleration measuring unit is configured to enable setting of the acceleration threshold value and the N value, and
there is further comprised a setting unit configured to determine the acceleration threshold value and the N value that do not satisfy the activation condition when acceleration in the predetermined direction changes in a temporal change pattern, and to set the acceleration threshold value and the N value in the acceleration measuring unit, based on the temporal change pattern of acceleration in the predetermined direction measured by the acceleration measuring unit in a situation where no earthquake has occurred.

14. The seismic sensor according to claim 13, wherein
from combinations of the acceleration threshold value and the N value specified in advance, the setting unit determines the acceleration threshold value and the N value that do not satisfy the activation condition when acceleration in the predetermined direction changes in the temporal change pattern, and the setting unit sets the acceleration threshold value and the N value in the acceleration measuring unit.

15. A sensor control method of controlling a seismic sensor comprising a three-axis acceleration sensor and a microcontroller, the sensor control method comprising:
operating the seismic sensor in a standby mode in which monitoring is performed on establishment of an activation condition in which N measurement results, N being a value equal to or smaller than M and equal to or larger than 2, in M consecutive measurement results, M being a value equal to or larger than 2, comprising acceleration in a predetermined direction by the three-axis acceleration sensor exceed an acceleration threshold value; and
causing the microcontroller to start an operation in a measurement mode with larger power consumption than power consumption in the standby mode when the activation condition is established.

* * * * *